United States Patent [19]

Thomas

[11] Patent Number: 4,597,287
[45] Date of Patent: Jul. 1, 1986

[54] STABILIZED WIND DIRECTION INDICATOR

[76] Inventor: Richard R. Thomas, 367 Tranmere Rd., Howrah, Tas. 7018, Australia

[21] Appl. No.: 651,827

[22] Filed: Sep. 18, 1984

[30] Foreign Application Priority Data

Sep. 19, 1983 [AU] Australia .................... PG1466

[51] Int. Cl.⁴ .................................................. G01W 1/00
[52] U.S. Cl. ............................................................ 73/188
[58] Field of Search ....................................... 73/188, 189

[56] References Cited

U.S. PATENT DOCUMENTS

| | | | |
|---|---|---|---|
| 1,827,151 | 10/1931 | Jones | 73/189 |
| 2,363,087 | 11/1944 | Salisbury | 73/188 |
| 2,681,569 | 6/1954 | Hirschoff | 73/188 |
| 3,049,008 | 8/1962 | Polster | 73/188 |
| 3,371,529 | 3/1968 | Tillman | 73/188 |
| 4,389,887 | 6/1983 | Howlett | 73/189 |

*Primary Examiner*—Charles A. Ruehl
*Attorney, Agent, or Firm*—Dennison, Meserole, Pollack & Scheiner

[57] ABSTRACT

A wind direction indicator for a marine craft such as a sailboard has a horizontal spar consisting of a resilient portion connected to a curved plate which may be attached to the mast of the craft, and a rigid portion extending from said resilient portion to a universal joint which is also attached to a counter-balance foil which assumes a vertical position independent of the orientation of the mast. Vane is asymmetrically pivoted to the counter-balance foil, with the pivot point nearer the pointer of the vane than the tail.

7 Claims, 2 Drawing Figures

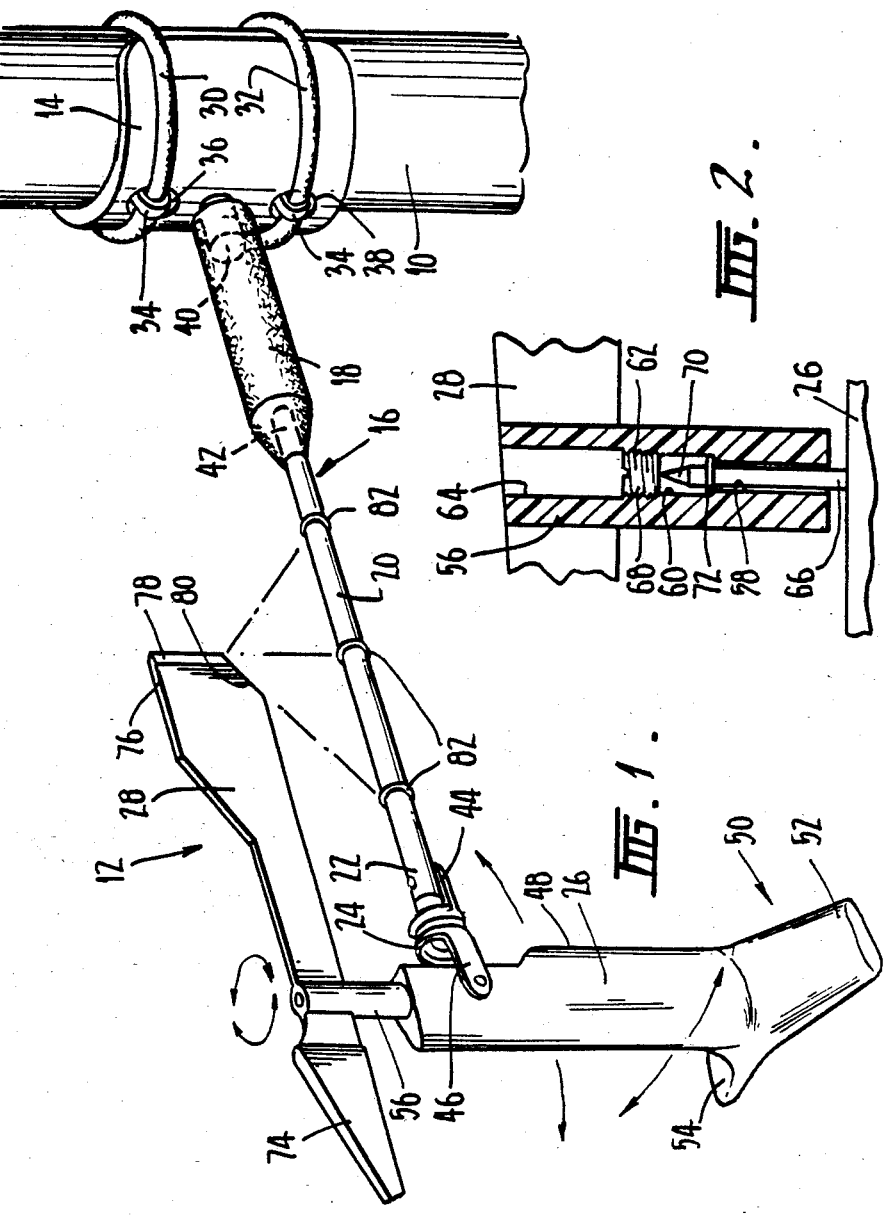

STABILIZED WIND DIRECTION INDICATOR

This invention relates to a wind direction indicator which is particularly suited to marine applications.

Wind indicators in the nature of weather-vanes or weathercocks are well known. They comprise an indicator-type vane pivoted on a support for movement through 360° in a horizontal plane. The wind force acting on the vane at any instant of time cause it to align with, and therefore indicate the direction of the wind.

Such wind indicators operate satisfactorily when the support is stationary, for example when mounted on a spire, tower or other building structure. If, however, the vane is mounted on a support which is not stationary, movement of the support in the horizontal and vertical directions will cause the wind indicator to go a false reading of wind direction.

A marine craft provides an inherently unstable platform for such a conventional wind direction indicator. However, it is desirable to have accurate wind direction indicators on many such craft, particularly sailing craft such as yachts and sailboards, where a knowledge of the wind direction assists the person or persons sailing the craft to maximize the effect of the wind.

It is an object of this invention to provide a stabilized wind direction indicator which will not be susceptible to the problems encountered by conventional indicators when supported by an unstable platform.

The invention provides a wind direction indicator for an unstable platform, including a counter-balance foil for attachment to said platform for movement about two axes relative to said platform, such that said foil tends to assume a particular orientation despite the orientation and motion of said platform, and by a vane pivotally attached to said counter-balance foil.

An embodiment of the invention will be described in detail hereinafter with reference to the accompanying drawings in which:

FIG. 1 is a perspective view of a wind direction indicator in position on the mast of a sailboard; and FIG. 2 is a section through the pivot body to which the vane of said indicator is attached.

The embodiment of the invention is described in relation to its use on a sailboard; specifically, attached to the mast 10 of a sailboard. It is to be understood that the indicator may be attached to any other suitable part of a sailboard, yacht, marine craft or any other support.

The wind direction indicator 12 includes a curved attachment plate 14, a spar 16 consisting of a resilient portion 18 extending from plate 14 and a rigid portion 20 extending from resilient portion 18, generally co-axial therewith.

At the forward end, assuming that the indicator 12 is located on mast 10 such that it faces the direction of travel of the sailboard, 22 of the rigid portion 20 there is located a universal joint 24, which joint 24 is also connected to counter-balance foil 26. Pivotally attached to counterweight 26 is vane 28.

Plate 14 is curved so that it fits snugly around part of the circumference of mast 10. The plate 14 is secured to mast 10 by O-rings 30,32, which are retained on plate 14 by strapping 34 which extends from apertures 36,38. Preferably, plate 14 is fabricated from cast-aluminium plastic coated.

Of course, other methods of attachment of the indicator 12 to a sailboard mast 10 may be used. For example, a clamp-type arrangement could be used, which could be clamped around mast 10, leaving a portion of the circumference free at the aft end thereof. This sort of arrangement would be useful for masts which include a slot in which one edge of a sail slides and is retained. The connection shown in FIG. 1 is suitable for many presently available sailboard masts. It is envisaged that special connection points could be located on the masts of sailboards produced in the future.

Plate 14 has a protrusion 40, connected to which is the generally narrow, cylindrical resilient portion 18, which may be formed from rubber, spring steel, or any other suitable material. The portion 18 extends generally normally from plate 14.

It is provided to protect the indicator when the mast 10 falls from the generally vertical sailing position. If the vane/weight end of the indicator strikes the board, the sea, or any other object, the indicator 12 can flex at portion 18, which avoids severe and damaging impacts.

Extending from resilient portion 18 is the more narrow, cylindrical rigid portion 20, one end 42 of which is located in portion 18 or otherwise connected thereto. Portion 20 is generally co-axial with portion 18 and is preferably formed from coated aluminium. Portions 18,20 constitute spar 16.

The outer end 22 of rigid portion 20 is connected to first element 44 of universal joint 24. First element 44 is pivotally connected to the second element 46 of joint 24 to pivot about an axis generally coaxial with that of portions 18,20.

Second element 46 is bifurcated, and is pivotally connected to counterweight 26 about an axis joining the bifurcations only one of which is shown. Thus, in the position shown in FIG. 1, counterweight 26 is able to pivot relative to spar 16, in the directions indicated by the two sets of arrows.

Counterweight 26 has the general shape of an inverted 'Y' with a stem portion 48 an end plate portion 50 which has 'wings' 52,54 which are slightly downswept. The 'wings' 52,54 are intended to reduce the effects of turbulence on counter-balance 26, such as induced drag. It can be seen that the pivotal attachment of counter-balance 26 to second element 46 of universal joint 24 is located relatively high up on the stem portion 48; this maximizes the counter-balancing effect thereof on the wind direction indicator. The counter-balance 26 is preferably fabricated from cast aluminium coated in a plastics material.

Vane 28 is located in and secured, preferably releasably, in a slot in the top of generally cylindrical pivot body 56. Referring to FIG. 2, the body 56 has an axial bore 58 at the lower end thereof. Bore 58 of pivot body is designed to be slightly larger in diameter than the diameter of pin 66, the lower part of which is located in the top portion of stem 48 of counter-balance foil 26. This bore 58 communicates with a larger bore 60, the upper portion 62 of which is threaded. The bore 60 communicates with a further bore 64 at the top of body 56.

Grub screw 68 is adapted to screw into bore 60, cooperating with screw threads at the upper part thereof. To assemble the captive pivot arrangement of FIG. 2, grub screw 68 is unscrewed and removed through bore 64 (with vane 28 removed from body 56). Pin 66, which has a point 70 at its tip, is located in bores 58,60. A circlip or the like 72 is fitted to prevent body 56 separating from pin 66, and grub screw 68 is then reinserted, being screwed to the position shown in FIG. 2, where the flat lower surface thereof rests on point 70 to provide the pivoting contact. Of course, other types of pivoting arrangements could be used to pivot vane 28 relative to counterweight 26.

Vane 28 has a pointer 74 and a tail 76. It can be seen from FIG. 1 that the vane 28 is asymmetrically pivoted, in that vane 28 is attached to pivot body 56 much closer to pointer 74 than to tail 76. If the vane 28 is 154 mm long in an example, the pivot point could be 61 mm from the tip of pointer 74. Tail 76 has a vertical line 78 marked thereon, and to enable the line 78 to be seen from a position forward of the rear of the tail 76, the tail 76 has a cut-away portion 80. Horizontal stabilizer wings (not shown) may be fitted to tail 76 towards the rear thereof.

It is envisaged that the vane 28 and the pivot body 56 would be fabricated from plastics material, preferably injection moulded from said material.

Finally, rigid portion 20 of spar assembly 16 is provided with a movable reference point, here shown as an O-ring 82, which can be moved along portion 20 in order to provide a sighting marker for reading the position of line 78, to obtain 'reference' tacking and wind-shift angles.

The universal joint 24 and the mass of the counterbalance foil 26 operate to provide a relatively stable platform in relation to which vane 28 can pivot to indicate accurately, with its pointer 74 the direction of the wind. The mass of the counter-weight 26 tends to hold it in a vertical position, despite the movement of mass 10, by virtue of the operation of universal joint 24. It should be mentioned here that alternatives to the universal joint may be used, alternatives such as a Hooke's joint or a gimballed rings system. As pointed out earlier in this specification, the design of the counterweight 26 of FIG. 1 enables it to cope with tip turbulence and therefor induced drag. Of course, a different design of counterweight could also be utilized.

The asymmetric pivot point location in respect of vane 28 also prevents 'windmilling', that is, rapid spinning of the vane in high winds, which would, of course, render the indicator useless. The vane 28, although being asymmetrically pivoted, insofar as the area of the portions fore and aft of the pivot body 56, may be balanced about the pivot point as far as weight is concerned, for optimum operation in high wind conditions.

It can be seen that the embodiment described hereinbefore, and the invention in general, provide an effective wind direction indicator for unstable platforms.

I claim:

1. A wind direction indicator for an unstable platform, including a counter-balance foil for attachment to said platform for movement about two axes relative to said platform, such that said foil tends to assume a particular orientation, despite the orientation, and motion of said platform, by a vane pivotally attached to said counter-balance foil, a spar assembly, said counter-balance foil being connected to one end of said spar assembly, the other end of which is connected to means for attachment to said platform, said spar assembly including a resilient portion connected between said means and a relatively rigid portion, said spar assembly being connected to said counter-balance foil by a universal joint, said counter-balance foil having a generally inverted Y shape, with a stem and a base consisting of wings, and in that said stem is attached to said universal joint towards the top of said stem.

2. A wind direction indicator according to claim 1, wherein said vane includes a pointer and a tail and in that said vane is pivoted relative to said counter-balance foil at a point nearer to said pointer than to said tail.

3. A wind direction indicator according to claim 2, wherein said vane is balanced by weight, on either side of said point.

4. A wind direction indicator according to claim 3, including a generally cylindrical pivot body, said vane being connected to said generally cylindrical pivot body, said body having a first bore receiving a pin extending from said counter-balance foil, said pin having a point thereon, said first bore communicating with a larger diameter second bore, at least part of which is threaded to receive a grub screw, said pin is held in place in said pivot body by a circlip located in said second bore and the actual pivoting action takes place between said point and a surface of said grub screw.

5. A wind direction indicator according to claim 4, wherein said means for attachment is a curved plate adapted to seat upon part of a mast of a marine craft and in that said plate is secured to said mast by O-rings passing around said plate and said mast.

6. A wind direction indicator according to claim 5, wherein said marine craft is a sailboard.

7. A wind direction indicator for an unstable platform, including a counter-balance foil for attachment to said platform for movement about two axes relative to said platform, such that said foil tends to assume a particular orientation, despite the orientation and motion of said platform, by a vane pivotally attached to said counter-balance foil, a generally cylindrical pivot body, said vane being connected to said generally cylindrical pivot body, said body having a first bore receiving a pin extending from said counter-balance foil, said pin having a point thereon, said first bore communicating with a larger diameter second bore, at least part of which is threaded to receive a grub screw, said pin is held in place in said pivot body by a circlip located in said second bore and the actual pivoting action takes place between said point and a surface of said grub screw.

* * * * *